(12) United States Patent
Fagan et al.

(10) Patent No.: US 7,369,267 B2
(45) Date of Patent: *May 6, 2008

(54) HIGH RESOLUTION PRINTING METHOD

(75) Inventors: Mark Walter Fagan, Lexington, KY (US); Michael Anthony Marra, III, Lexington, KY (US); Randall David Mayo, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 1040 days.

This patent is subject to a terminal disclaimer.

(21) Appl. No.: 10/610,153

(22) Filed: Jun. 30, 2003

(65) Prior Publication Data

US 2004/0263871 A1    Dec. 30, 2004

(51) Int. Cl.
     *G06F 15/00*      (2006.01)
(52) U.S. Cl. .................... 358/1.2; 358/1.9; 347/15; 347/41
(58) Field of Classification Search ............. 358/1.2, 358/1.9, 521, 534; 347/15, 16, 43, 41
See application file for complete search history.

(56) References Cited

U.S. PATENT DOCUMENTS

| | | | |
|---|---|---|---|
| 4,068,241 A | 1/1978 | Yamada | |
| 4,198,642 A | 4/1980 | Gamblin | |
| 4,272,771 A | 6/1981 | Furukawa | |
| 4,401,991 A | 8/1983 | Martin | |
| 4,714,964 A | 12/1987 | Sasaki | |
| 5,469,198 A | 11/1995 | Kadonaga | |
| 5,592,592 A | 1/1997 | Shu | |
| 5,600,351 A | 2/1997 | Holstun et al. | |
| 5,604,597 A | 2/1997 | Imai | |
| 5,638,107 A | 6/1997 | Curry | |
| 5,920,653 A | 7/1999 | Silverstein | |
| 5,943,072 A | 8/1999 | Robert et al. | |
| 5,949,453 A | 9/1999 | Harris et al. | |
| 6,099,104 A | 8/2000 | Sato et al. | |
| 6,099,108 A | 8/2000 | Weber et al. | |
| 6,135,655 A | 10/2000 | Magirl | |
| 6,149,260 A | 11/2000 | Minakuti | |
| 6,154,228 A | 11/2000 | Okuda et al. | |
| 6,238,037 B1 | 5/2001 | Overall et al. | |
| 6,257,685 B1 | 7/2001 | Ishikawa | |
| 6,270,185 B1 | 8/2001 | Askeland | |
| 6,283,571 B1 | 9/2001 | Zhou et al. | |
| 6,290,315 B1 | 9/2001 | Sayama | |
| 6,299,284 B1 | 10/2001 | Alfaro | |
| 6,305,775 B1 | 10/2001 | Ohtsuka et al. | |
| 6,312,096 B1 | 11/2001 | Koitabashi et al. | |
| 6,318,832 B1 | 11/2001 | Bates et al. | |
| 6,328,400 B1 | 12/2001 | Yonekubo et al. | |
| 6,336,701 B1 | 1/2002 | Hickman | |
| 6,338,542 B1 | 1/2002 | Fujimori | |
| 6,367,908 B1 | 4/2002 | Serra et al. | |

(Continued)

*Primary Examiner*—Kimberly A Williams
(74) *Attorney, Agent, or Firm*—Taylor & Aust, PC

(57) ABSTRACT

A method for performing drop placement by an imaging apparatus includes the steps of defining a matrix that identifies all possible drop locations at an output resolution; defining primary drop locations in the matrix for each color of interest based on predefined criteria; defining secondary drop locations in the matrix for the each color of interest; and establishing rules to assign input data received at an input resolution to particular locations of the primary drop locations and the secondary drop locations in the matrix.

20 Claims, 15 Drawing Sheets

U.S. PATENT DOCUMENTS

| | | |
|---|---|---|
| 6,406,111 B1 | 6/2002 | Klassen et al. |
| 6,406,115 B2 | 6/2002 | Mantell et al. |
| 6,406,116 B1 | 6/2002 | Katakura et al. |
| 6,411,399 B1 | 6/2002 | Mantell et al. |
| 6,412,909 B1 | 7/2002 | Tayuki et al. |
| 6,464,330 B1 | 10/2002 | Miller et al. |
| 6,471,322 B2 | 10/2002 | Kandra et al. |
| 6,474,779 B2 | 11/2002 | Inui et al. |
| 7,140,710 B2 * | 11/2006 | Marra et al. .................. 358/1.9 |
| 2001/0050699 A1 | 12/2001 | Hickman |
| 2002/0054182 A1 | 5/2002 | Yazawa |
| 2002/0105557 A1 | 8/2002 | Teshigawara et al. |
| 2002/0163557 A1 | 11/2002 | Du et al. |
| 2004/0042047 A1 * | 3/2004 | Kawatoko et al. ......... 358/3.06 |

* cited by examiner

4800 X 1200 DPI DROP LOCATIONS

2400 X 1200 DPI DROP LOCATIONS

1200 X 1200 DPI DROP LOCATIONS

CYAN: 4800 X 1200 DPI PRIMARY DROP LOCATIONS

MAGENTA: 4800 X 1200 DPI PRIMARY DROP LOCATIONS

YELLOW: 4800X1200 DPI PRIMARY DROP LOCATIONS

CYAN: 2400 X 1200 DPI PRIMARY DROP LOCATIONS

MAGENTA: 2400 X 1200 DPI PRIMARY DROP LOCATIONS

YELLOW: 2400 X 1200 DPI PRIMARY DROP LOCATIONS

CYAN: 1200 X 1200 DPI PRIMARY DROP LOCATIONS

MAGENTA: 1200 X 1200 DPI PRIMARY DROP LOCATIONS

YELLOW: 1200 X 1200 DPI PRIMARY DROP LOCATIONS

1

HIGH RESOLUTION PRINTING METHOD

BACKGROUND OF THE INVENTION

1. Field of the invention

The present invention relates to imaging, and, more particularly, to a high resolution printing method for an imaging apparatus, such as an ink jet printer.

2. Description of the related art

A typical ink jet printer forms an image on a print medium by ejecting ink from at least one ink jet printhead to form a pattern of ink dots on the print medium. Such an ink jet printer includes a reciprocating printhead carrier that transports one or more ink jet printheads across the print medium along a bi-directional scanning path defining a print zone of the printer. The bi-directional scanning path is oriented parallel to a main scan direction, also commonly referred to as the horizontal direction. During each scan of the printhead carrier, the print medium is held stationary. An indexing mechanism is used to incrementally advance the print medium in a sheet feed direction, also commonly referred to as a sub-scan direction or vertical direction, through the print zone between scans in the main scan direction, or after all data intended to be printed with the print medium at a particular stationary position has been completed.

For a given stationary position of the print medium, printing may take place during one or more unidirectional scans of the printhead carrier. The height of the printhead generally defines a printing swath as ink is deposited on the print medium during a particular unidirectional scan of the printhead carrier. A printing swath is made of a plurality of printing lines traced along imaginary rasters, the imaginary rasters being spaced apart in the sheet feed direction, e.g., vertically. In order to form the pattern of ink drops on the print medium, a rectilinear array, also known as a matrix, of possible pixel, i.e., drop, locations is defined within the printable boundaries of the print medium. The closest possible spacing of ink drops in the main scan direction is typically referred to as the horizontal resolution, and the closest possible spacing of ink drops in the sub-scan direction, i.e., between adjacent rasters, is typically referred to as the vertical resolution.

The quality of printed images produced by an ink jet printer depends in part on the resolution of the printer. Typically, higher or finer resolutions, where the printed dots are more closely spaced, results in higher quality images. Increasing the resolution of an ink jet printer increases the number of dots to be printed in a unit area by the product of the increase factor in each dimension in the grid. For example, doubling the print resolution from 300 dpi (dots, or drops, per inch) to 600 dpi in a matrix results in four times as many dots per unit area.

Printing quality using an ink jet printer of the type described above can be further improved by using a technique commonly referred to as shingling, or interlaced printing, wherein consecutive printing swaths are made to overlap and only a portion of the ink drops for a given print line, i.e., raster, are applied to the print medium on a given pass of the printhead. For example, in one known shingling mode using 50% shingling, approximately 50% of the dots for a particular color are placed on any given pass of the printhead, thereby requiring two passes of the printhead to completely print a particular raster. The candidate dots of the first pass of the printhead may be selected according to a checkerboard pattern. The remaining 50% of the dots are placed on a subsequent pass of the printhead.

In typical shingling methods, however, as resolution increases, so does the number of passes of the printhead required to print the image data. Accordingly, while increasing resolution and using shingling patterns to mask printing defects increases the printing quality, such an approach that significantly increases the number of printing passes may not be optimum from an efficiency standpoint in terms of throughput of the printer.

What is needed in the art is a high resolution printing method that retains the advantages of shingling methods typically used in the art, yet does not increase the number of passes that are required to print an image at a high resolution.

SUMMARY OF THE INVENTION

The present invention provides a high resolution printing method that retains the advantages of shingling methods typically used in the art, yet does not increase the number of passes that are required to print an image at a high resolution.

The invention, in one form thereof, is related to a method for performing drop placement by an imaging apparatus, including the steps of defining a matrix that identifies all possible drop locations at an output resolution; defining primary drop locations in the matrix for each color of interest based on predefined criteria; defining secondary drop locations in the matrix for the each color of interest; and establishing rules to assign input data received at an input resolution to particular locations of the primary drop locations and the secondary drop locations in the matrix.

In another form thereof, the invention is related to a method of drop placement in forming an image, including the steps of defining an input resolution for a plurality of colors; defining an output resolution in a first direction, the output resolution being greater than the input resolution; defining a matrix of drop locations at the output resolution in the first direction; subdividing the matrix of drop locations into subdivisions at the input resolution, wherein a number of the drop locations in each subdivision is equal to the output resolution divided by the input resolution; defining, for the each subdivision, a first primary drop location and a first secondary drop location for a first color of the plurality of colors; defining, for the each subdivision, a second primary drop location and a second secondary drop location for a second color of the plurality of colors; determining for the each subdivision whether ink of the first color will be deposited at one of the first primary location and the first secondary location; determining for the each subdivision whether ink of the second color will be deposited at one of the second primary location and the second secondary location; depositing an ink drop of the first color, if any, at only one of the first primary location and the first secondary location within one subdivision of the subdivisions; and depositing an ink drop of the second color, if any, at only one of the second primary location and the second secondary location within one subdivision of the subdivisions.

In another form thereof, the invention is related to a method for performing drop placement by an imaging apparatus, including the steps of establishing a matrix at an output resolution that defines a plurality of primary drop locations for each color of a plurality of colors; and establishing rules to assign input data received at an input resolution to particular primary drop locations of the plurality of primary drop locations such that no dominant color shares a primary drop location with another dominant color.

One advantage of the present invention is that, for a given output resolution, high resolution printing can be performed without requiring an increase in the number of print passes as required with traditional shingling methodologies, while retaining the increase in print quality provided by such methodologies.

Another advantage of the present invention is that, for an imaging apparatus with hardware designed to print at 600 dpi, consecutive 600 dpi (horizontal) dots can magnify printing errors due to the imaging apparatus mechanism or printhead.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

Figure 1:
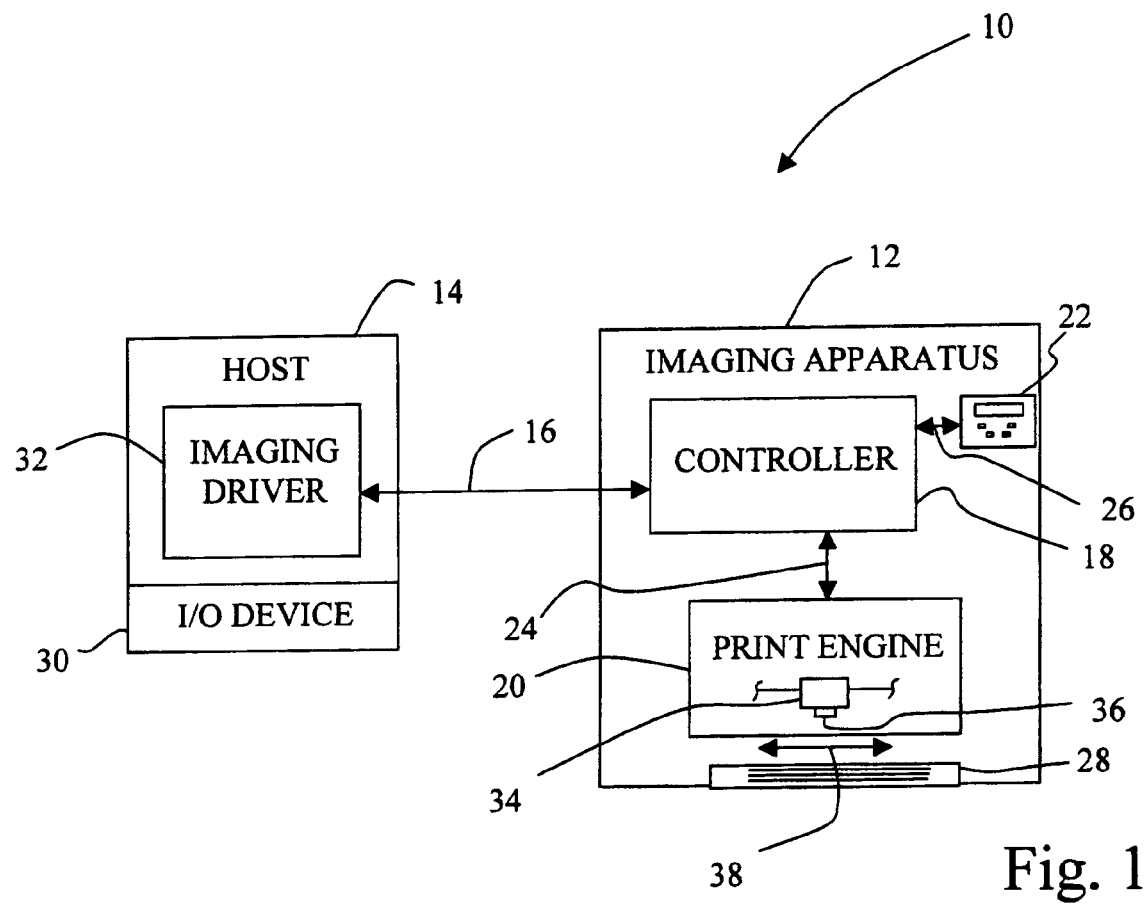
FIG. 1 is a diagrammatic representation of a system employing an embodiment of the present invention.

Referring now to the drawings, and particularly to FIG. 1, there is shown a diagrammatic depiction of a system 10 embodying the present invention. System 10 includes an imaging apparatus 12 and a host 14. Imaging apparatus 12 communicates with host 14 via a communications link 16.

Imaging apparatus 12 can be, for example, an ink jet printer and/or copier. Imaging apparatus 12 includes a controller 18, a print engine 20 and a user interface 22.

Controller 18 includes a processor unit and associated memory, and may be formed as an Application Specific Integrated Circuit (ASIC). Controller 18 communicates with print engine 20 via a communications link 24. Controller 18 communicates with user interface 22 via a communications link 26.

In the context of the examples for imaging apparatus 12 given above, print engine 20 can be, for example, an ink jet print engine configured for forming an image on a print medium 28, such as a sheet of paper, transparency or fabric.

Host 14 may be, for example, a personal computer including an input/output (I/O) device 30, such as keyboard and display monitor. Host 14 further includes a processor, input/output (I/O) interfaces, memory, such as RAM, ROM, NVRAM, and a mass data storage device, such as a hard drive, CD-ROM and/or DVD units. During operation, host 14 includes in its memory a software program including program instructions that function as an imaging driver 32, e.g., printer driver software, for imaging apparatus 12. Imaging driver 32 is in communication with controller 18 of imaging apparatus 12 via communications link 16. Imaging driver 32 facilitates communication between imaging apparatus 12 and host 14, and may provide formatted print data to imaging apparatus 12, and more particularly, to print engine 20. Alternatively, however, all or a portion of imaging driver 32 may be located in controller 18 of imaging apparatus 12.

Communications link 16 may be established by a direct cable connection, wireless connection or by a network connection such as for example an Ethernet local area network (LAN). Communications links 24 and 26 may be established, for example, by using standard electrical cabling or bus structures, or by wireless connection.

Print engine 20 may include, for example, a reciprocating printhead carrier 34 that carries at least one ink jet printhead 36, and may be mechanically and electrically configured to mount, carry and facilitate multiple cartridges, such as a monochrome printhead cartridge and/or one or more color printhead cartridges, each of which including a respective printhead 36. For example, in systems using cyan, magenta, yellow and black inks, printhead carrier 34 would carry four printheads, one printhead for each of cyan, magenta, yellow and black.

Figure 2:
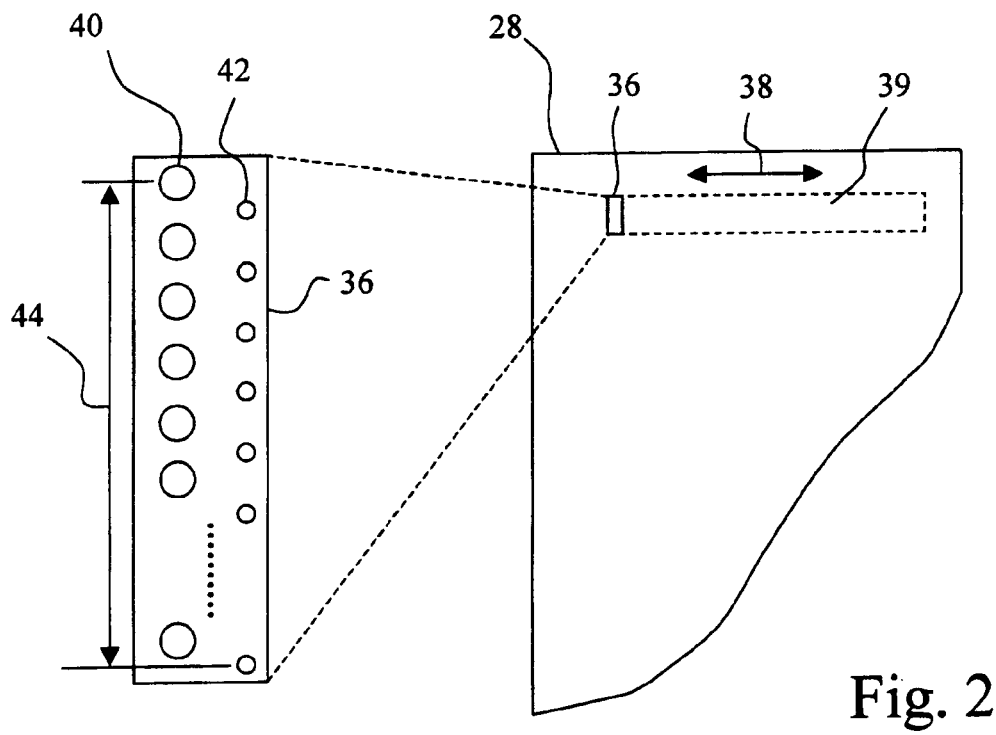
FIG. 2 is a diagrammatic representation of a printhead defining a swath on a print medium.

Referring also to FIG. 2, printhead carrier 34 is controlled by controller 18 to move printhead 36 in a reciprocating manner along a bi-directions scan path 38, which will also be referred to herein as horizontal direction 38. Each left to right, or right to left movement of printhead carrier 34 along bi-directional scan path 38 over print medium 28 will be referred to herein as a pass. The area traced by printhead 36 over print medium 28 for a given pass will be referred to herein as a swath, such as for example, swath 39 as shown.

FIG. 2 shows in enlarged and exaggerated form for ease of understanding a bottom view of an exemplary nozzle configuration for ink jet printhead 36. As shown, printhead 36 may be configured, for example, with both large nozzles 40 and small nozzles 42. Each ink drop expelled, or to be expelled, from each large nozzle 40 will be referred to as a large drop. Each ink drop expelled, or to be expelled, from each small nozzle 42 will be referred to as a small drop. A swath height corresponds to the distance 44 between the uppermost and lowermost of the nozzles of printhead 36. As used herein, C represents a large cyan drop, c represents a small cyan drop, M represents a large magenta drop, m represents a small magenta drop, Y represents a large yellow drop, and y represents a small yellow drop. K may represent either a large or small black drop.

In order for print data from host 14 to be properly printed by print engine 20, the rgb data generated by host 14 must be converted into data compatible with print engine 20 and printhead 36.

Figure 3:
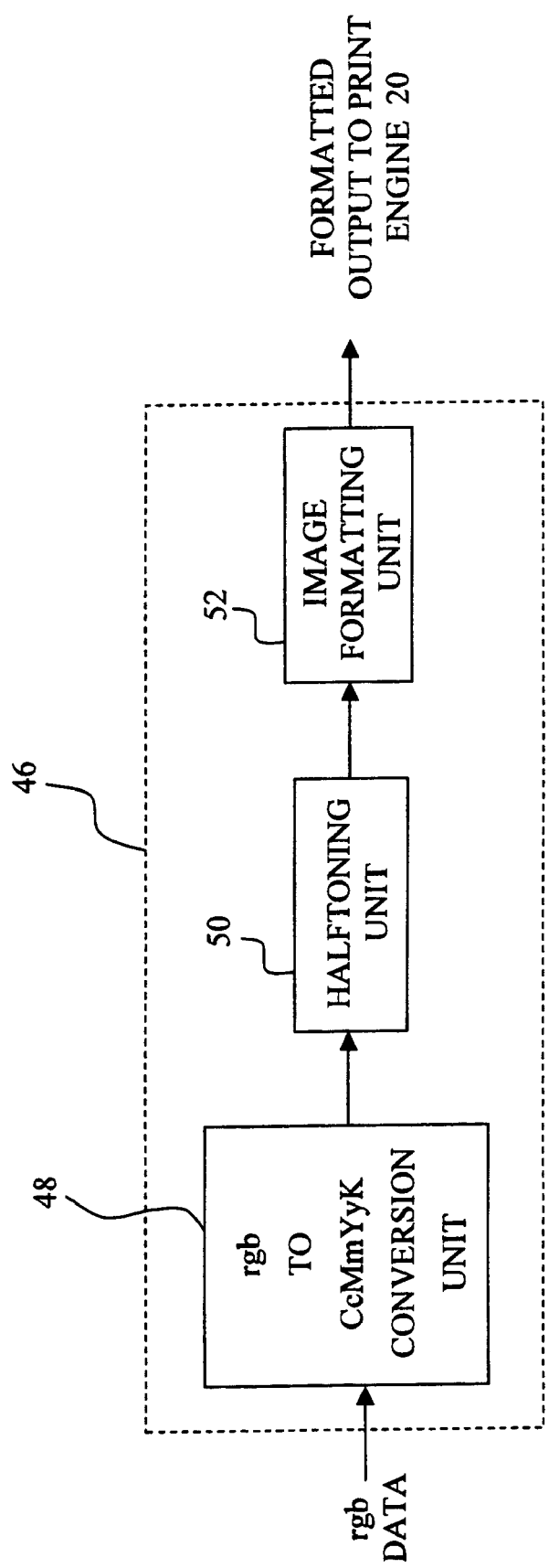
FIG. 3 is a diagrammatic representation of a data conversion unit contained in the imaging system of FIG. 1.

FIG. 3 is a block diagram of an exemplary data conversion unit 46 that is used to convert rgb data generated by host 14 into data compatible with print engine 20. Data conversion unit 46 may be in the form of software or firmware. Data conversion unit 46 may be located in imaging driver 32 of host 14, in controller 18 of imaging apparatus 12, or a portion of data conversion unit 46 may be located in each of imaging driver 32 and controller 18.

Data conversion unit 46 includes an rgb-to-CcMmYyK conversion unit 48, a halftoning unit 50 and an image formatting unit 52. In general, conversion unit 48 takes signals from one color space domain and converts them into signals of another color space domain for each image generation. As is well known in the art, color conversion takes place to convert from a light-generating color space domain of, for example, a color display monitor that utilizes primary colors red (r), green (g) and blue (b) to a light-reflective color space domain of, for example, a color printer that utilizes colors, such as for example, cyan (C, c), magenta (M, m), yellow (Y, y) and black (K).

As shown, rgb data, such as the output from an application executed on host 14, is supplied to rgb-to-CcMmYyK conversion unit 48 to generate CcMmYyK continuous tone data. The CcMmYyK continuous tone data is then processed by halftoning unit 50 to generate CcMmYyK halftoned image data. The CcMmYyK halftoned image data is then processed via image formatting unit 52 to produce bit-mapped image data at a desired format and resolution for use by print engine 20.

In accordance with the present invention, image formatting unit 52, which may be in the form of software and/or firmware, and may utilize one or more lookup tables, performs a computer implemented method that takes the halftoned data from halftoning unit 50 and expands it prior to formatting the data for printing. This computer implemented method includes a set of rules that ensure that no consecutive drops will be printed on the same print pass with the same ink jet nozzle. Also, the placement of drops is coordinated to distribute the drops between print passes, and to distribute the different color drops between print passes, in such a way as to lessen the effects of print engine mechanism and printhead errors.

Figure 4:
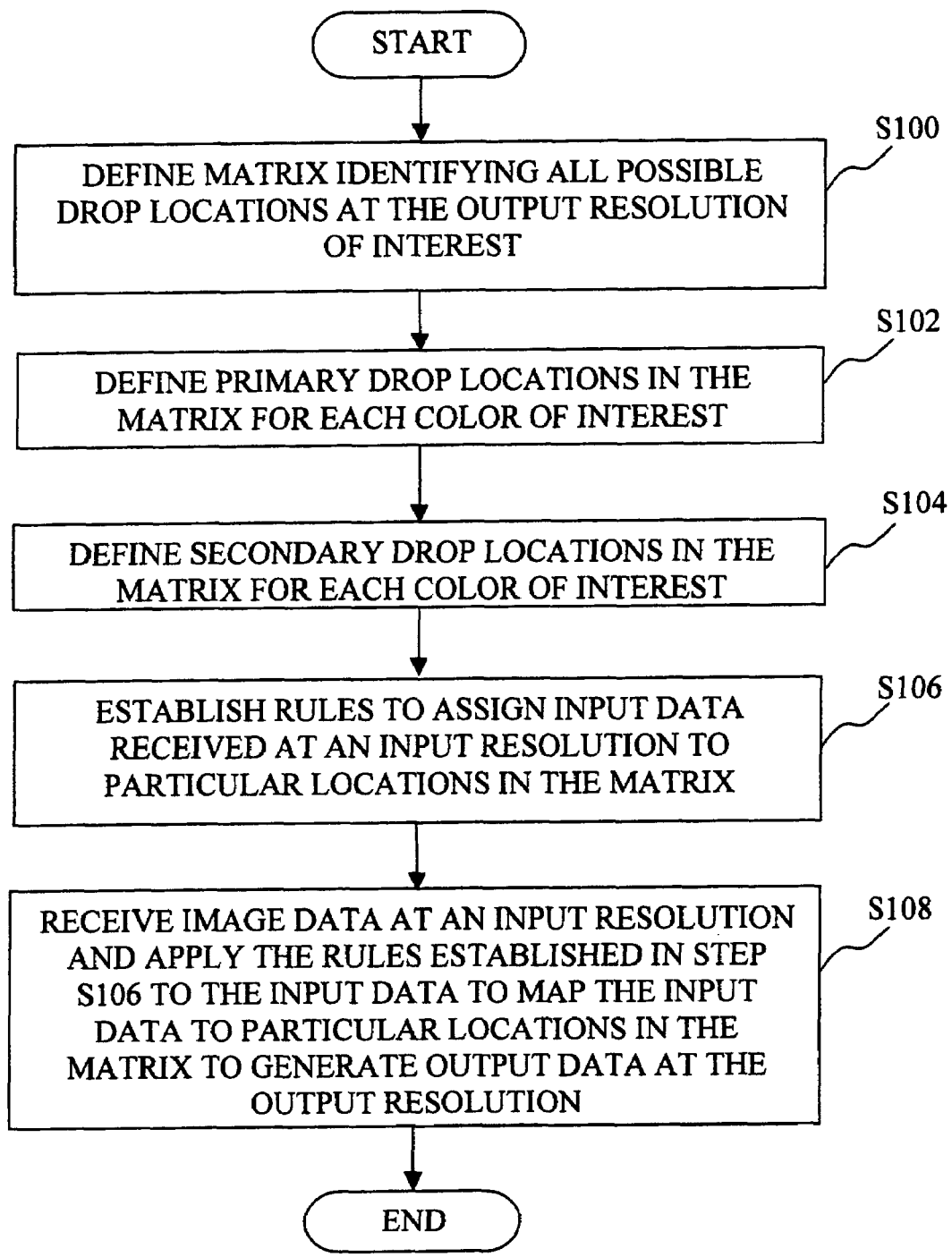
FIG. 4 is a flowchart of a method in accordance with the present invention.

FIG. 4 is a flow chart of a method in accordance with the present invention.

At step S100, a matrix is defined that identifies all possible drop locations at the output resolution of interest. As used herein, resolution will be described in terms of horizontal resolution (H) by vertical resolution (V), e.g., a resolution of H ×V dpi, wherein dpi represents dots, or drops, per inch.

Figure 5:
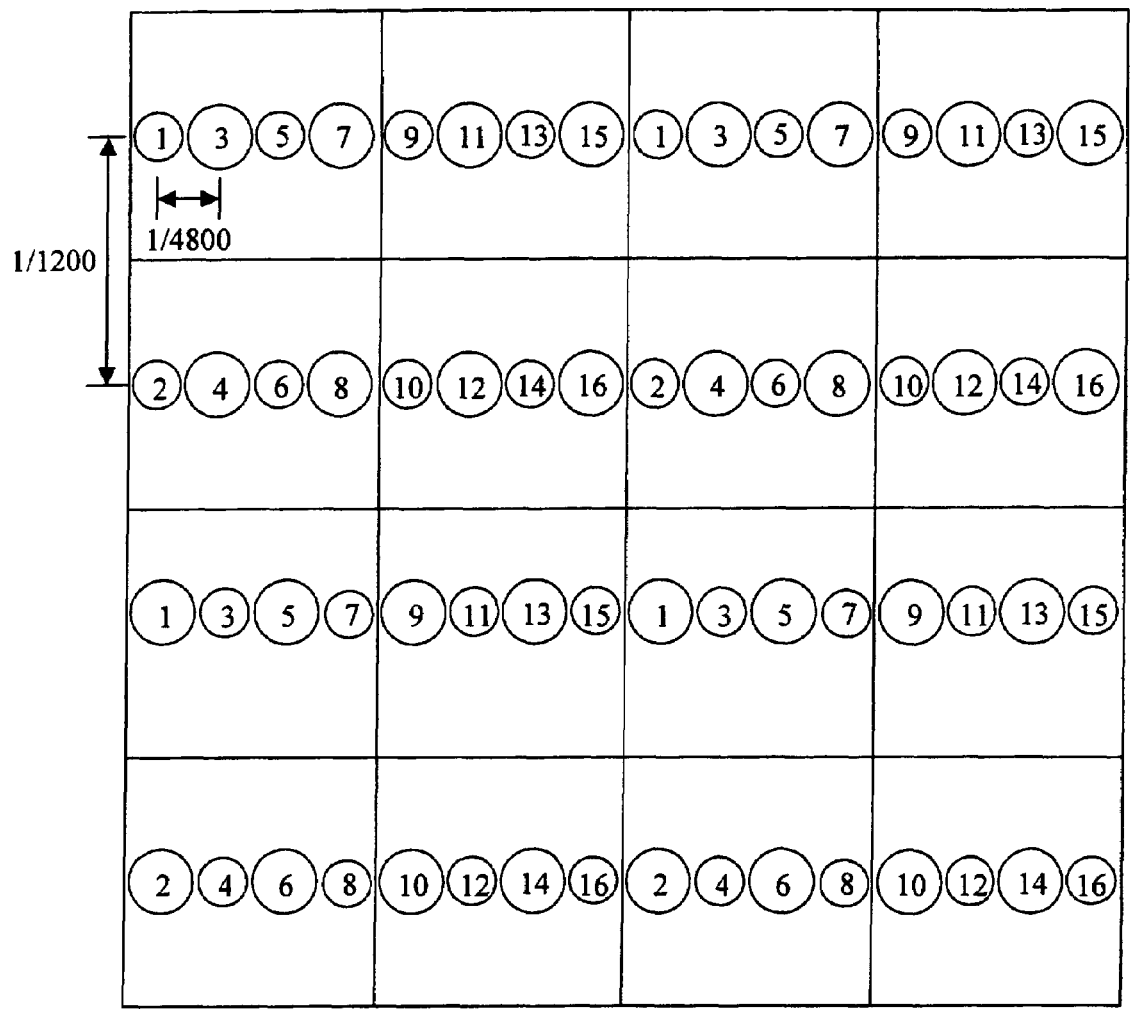
FIG. 5 shows a pictorial example of a portion of a matrix identifying all drop locations at an output resolution of interest, in this example, at 4800 ×1200 dpi.
Figure 6:
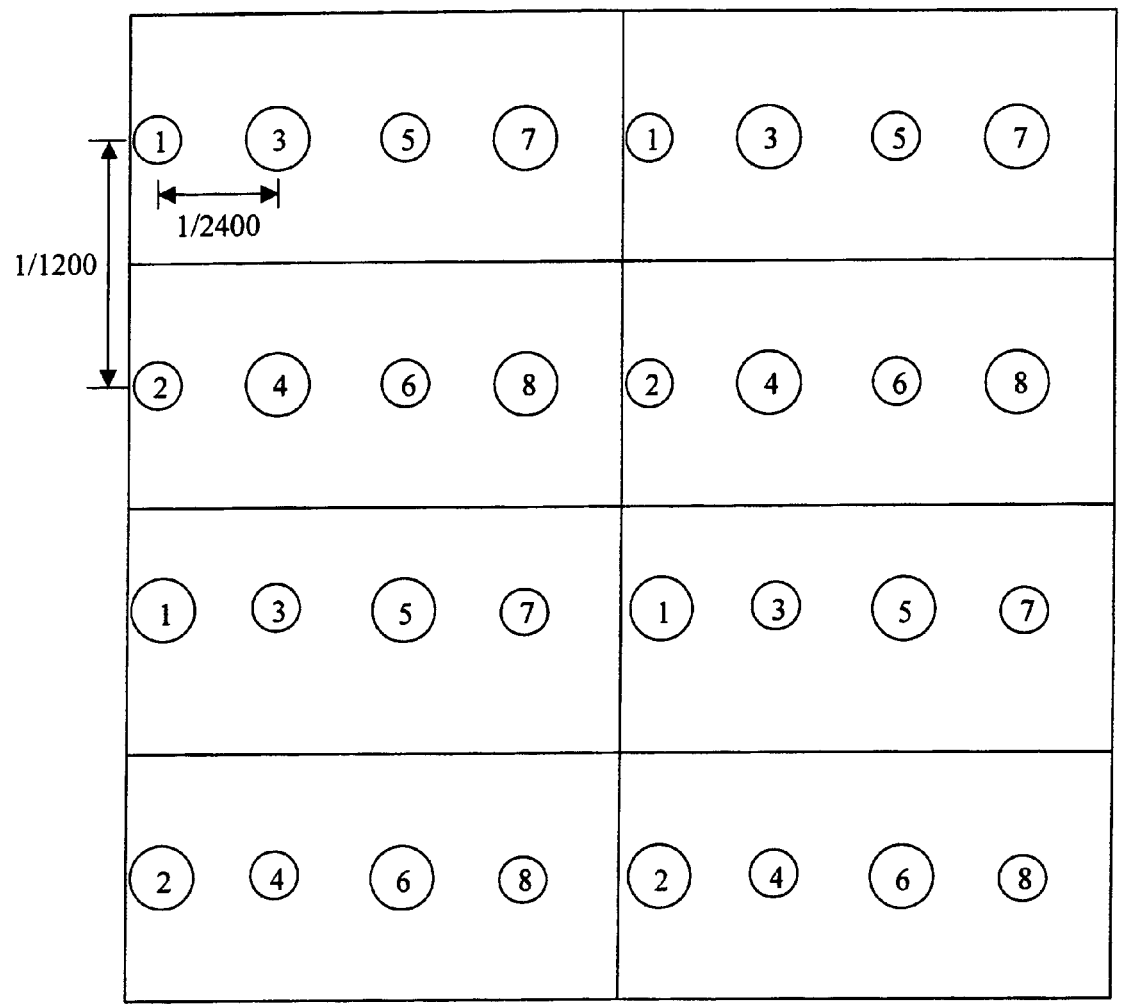
FIG. 6 shows a pictorial example of a portion of a matrix identifying all drop locations at an output resolution of interest, in this example, at 2400 ×1200 dpi.
Figure 7:
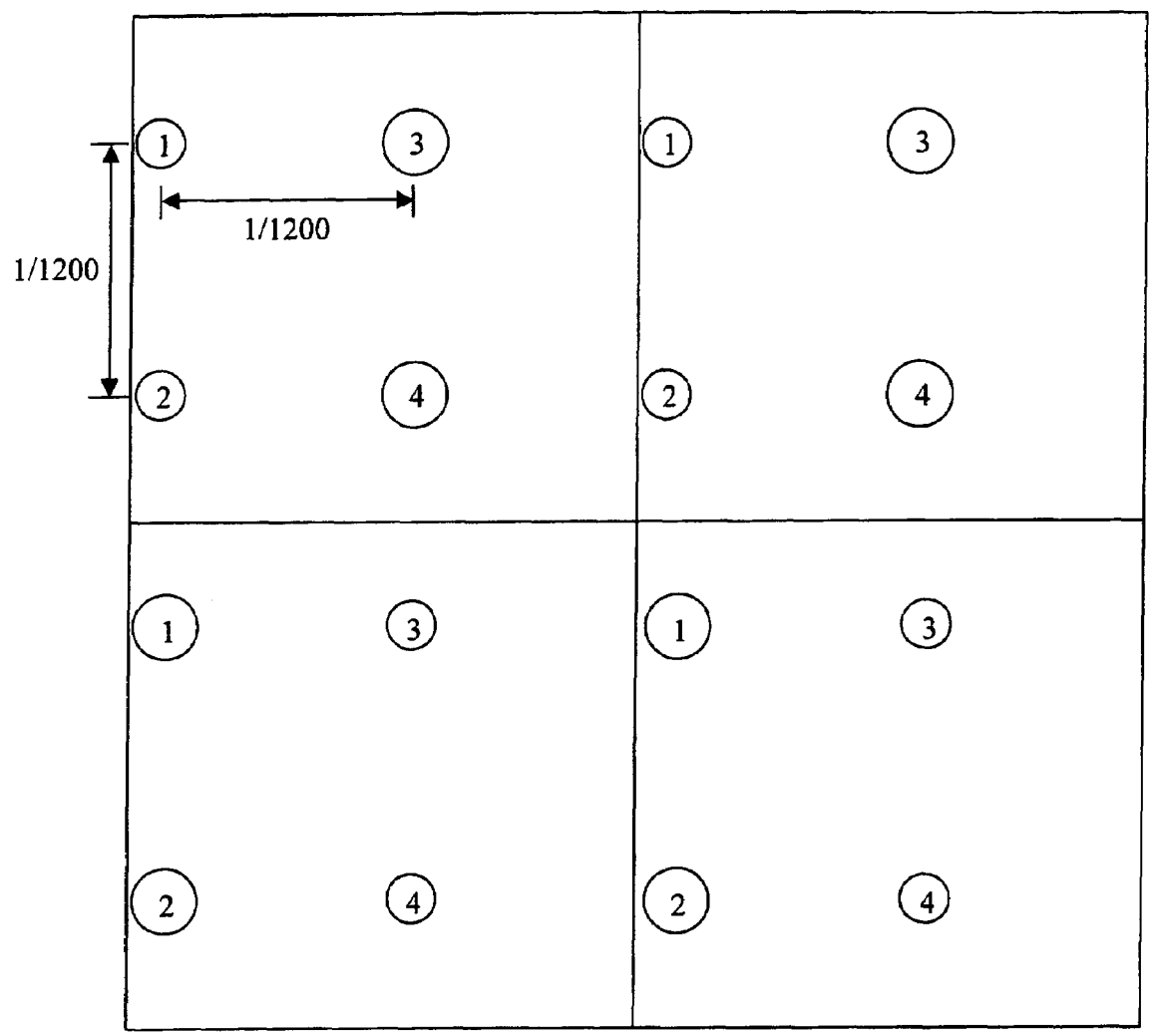
FIG. 7 shows a pictorial example of a portion of a matrix identifying all drop locations at an output resolution of interest, in this example, at 1200 ×1200 dpi.

FIGS. 5, 6 and 7 shows pictorial examples of a portion of such a matrix, including both large drop locations (represented by the larger circles) and small drop locations (represented by the smaller circles) for three different output resolutions. Also, each of the locations is assigned a pass number of a plurality of pass numbers indicating a particular pass of a printhead in which a particular location can receive an ink drop. The pass number is represented by the number in the particular circle.

In the example of FIG. 5, for 1200 ×1200 dpi resolution input data, drop locations are defined to generate an output resolution of 4800 ×1200 dpi. In the example of FIG. 6, for 600 ×1200 dpi resolution input data, drop locations are defined to generate an output resolution of 2400 ×1200 dpi. In the example of FIG. 7, for 600 ×600 dpi resolution input data, drop locations are defined to generate an output resolution of 1200 ×1200 dpi.

At step S102, primary drop locations are defined in the matrix for each color of interest (e.g., C, c, M, m, Y, y) based, for example, on predefined criteria. Each of the primary locations for a particular color is assigned a pass number of a plurality of pass numbers indicating a particular pass of a printhead in which a particular primary location of the primary locations can receive an ink drop of the particular color. The pass numbers for the primary locations correspond to the pass numbers originally assigned for each of the drop locations for the entire matrix, discussed above in step S100.

The criteria may be in the form of a set of rules, such as for example:

Rule P1: Primary locations are assigned based on raster and column.

Rule P2: No consecutive 600 dpi drops of the same color is permitted on the same pass, so as to limit the firing frequency per nozzle.

Rule P3: Dominant colors, e.g., cyan and magenta, are assigned different primary locations to mask print mechanism and printhead errors. A non-dominant color, e.g., yellow, will share primary locations with the primary locations for the dominant colors. Alternatively, by further increasing the horizontal output resolution, e.g., 7200 dpi, for a given input resolution, e.g., 1200 dpi, it is possible to define additional drop locations such that a non-dominant color need not share its primary drop locations with the primary drop locations of a dominant color.

Figure 8:
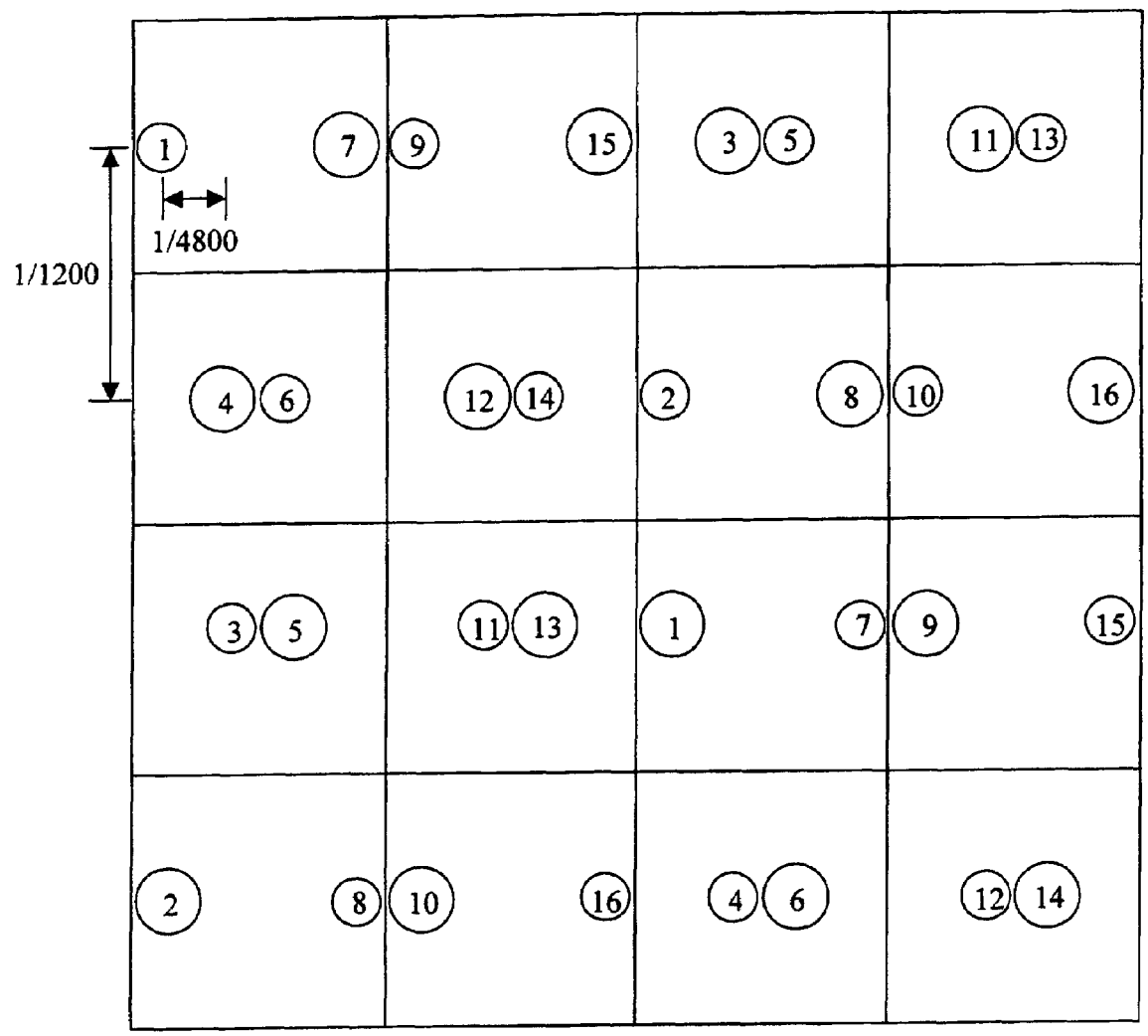
FIG. 8 shows a pictorial example of a portion of a matrix identifying primary locations for cyan at an output resolution of interest, in this example, at 4800 ×1200 dpi.
Figure 9:
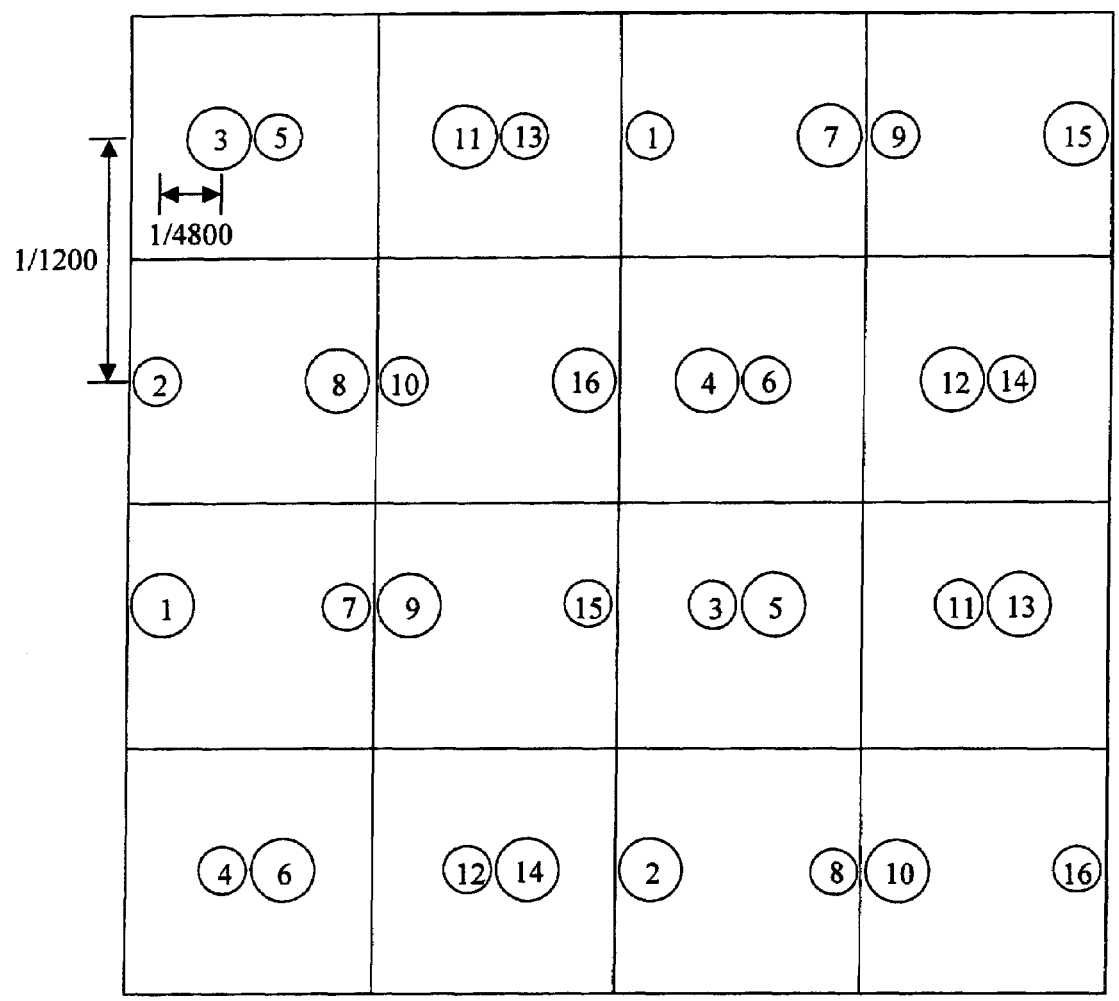
FIG. 9 shows a pictorial example of a portion of a matrix identifying primary locations for magenta at an output resolution of interest, in this example, at 4800 ×1200 dpi.
Figure 10:
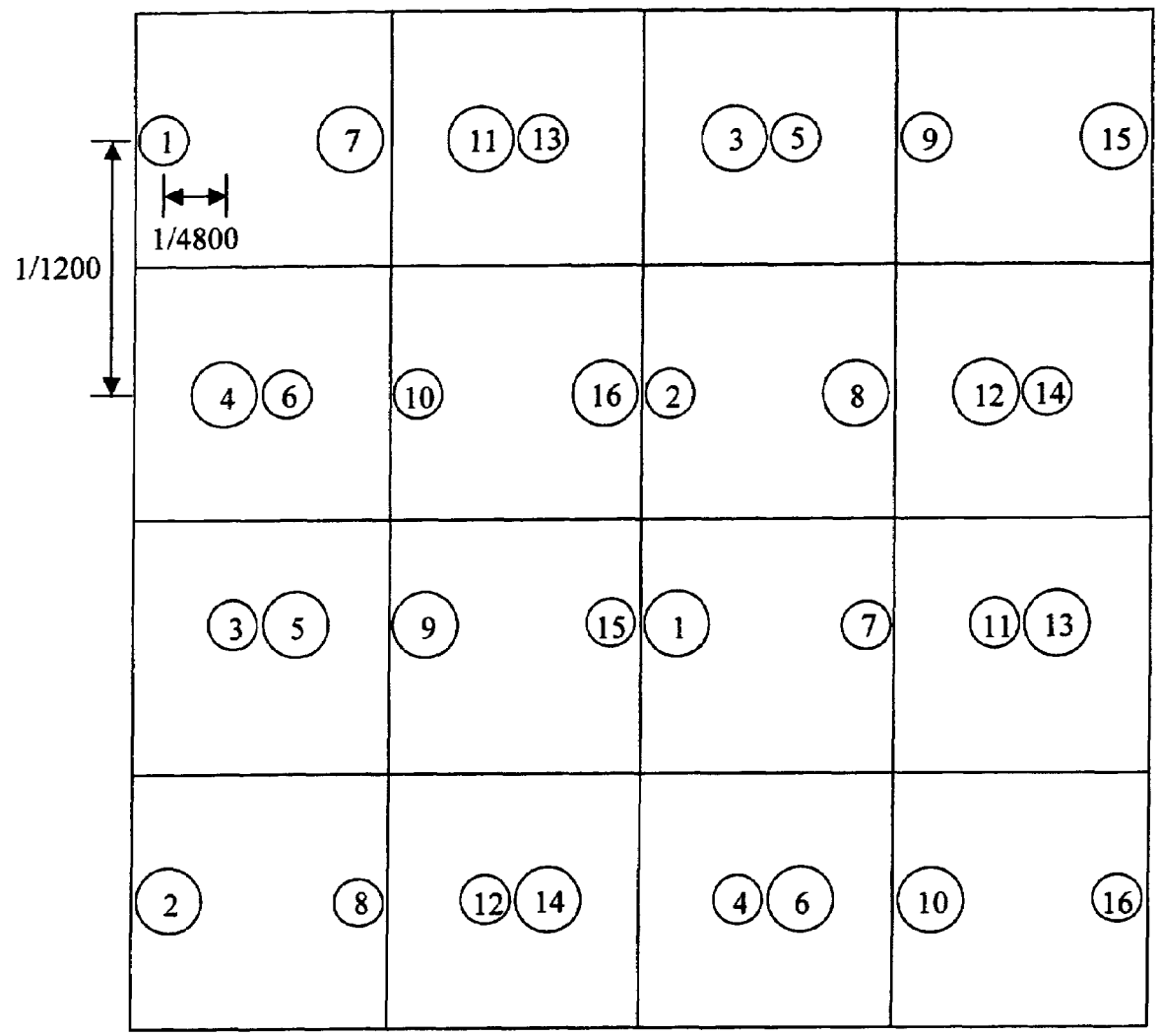
FIG. 10 shows a pictorial example of a portion of a matrix identifying primary locations for yellow at an output resolution of interest, in this example, at 4800 ×1200 dpi.

Based on an application of the rules set forth above, for example, for the 4800 ×1200 dpi output resolution of the locations shown in FIG. 5, FIG. 8 shows the primary locations for cyan, FIG. 9 shows the primary locations for magenta, and FIG. 10 shows the primary locations for yellow.

Figure 11:
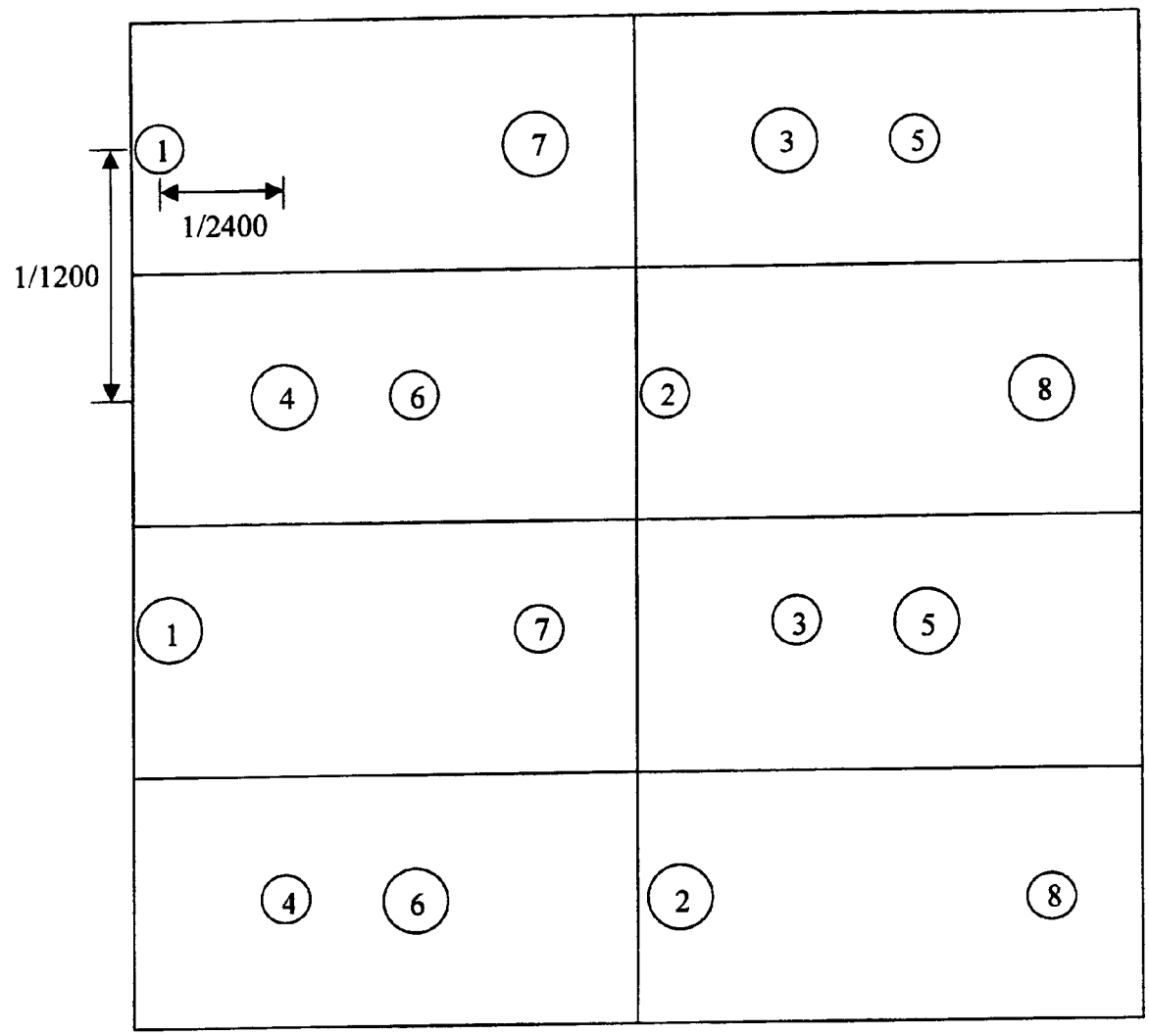
FIG. 11 shows a pictorial example of a portion of a matrix identifying primary locations for cyan at an output resolution of interest, in this example, at 2400 ×1200 dpi.
Figure 12:
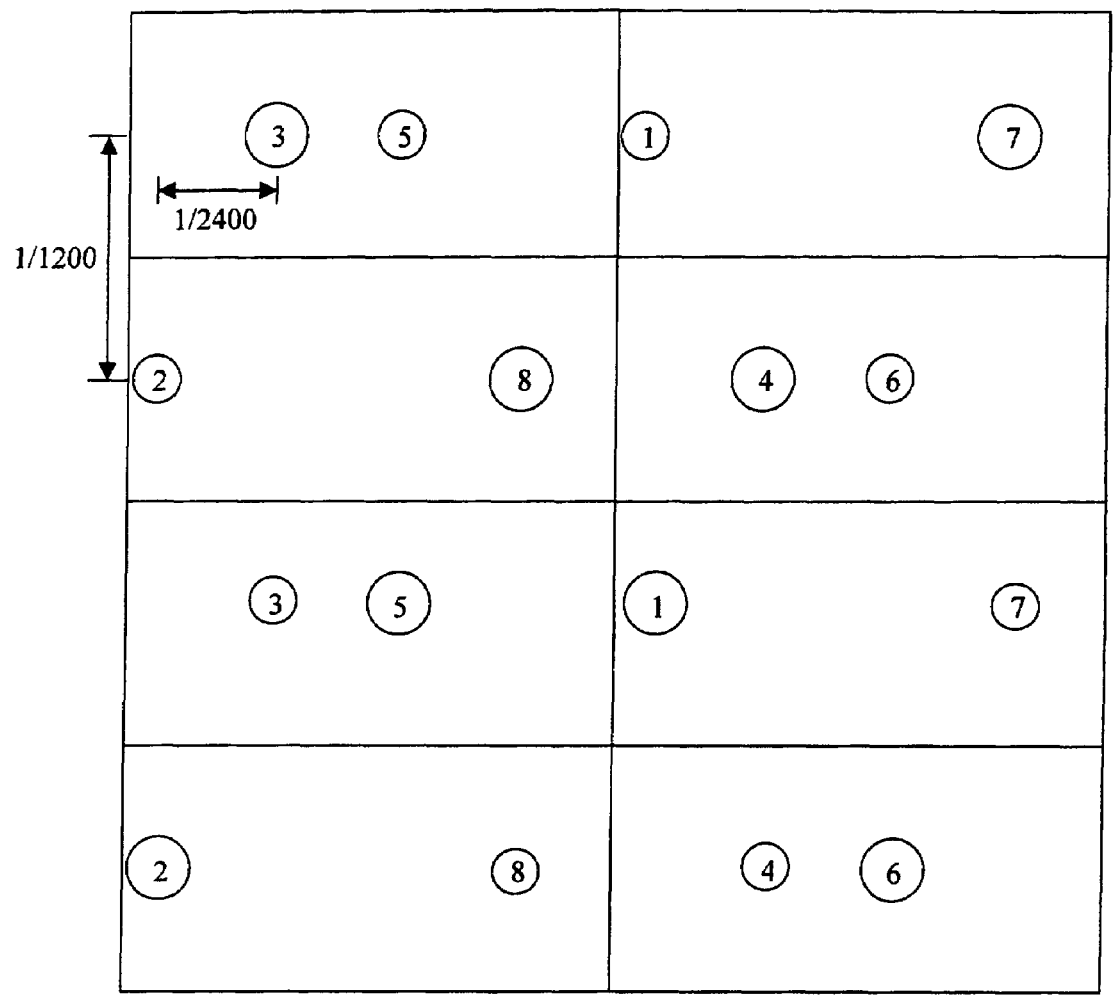
FIG. 12 shows a pictorial example of a portion of a matrix identifying primary locations for magenta at an output resolution of interest, in this example, at 2400 ×1200 dpi.
Figure 13:
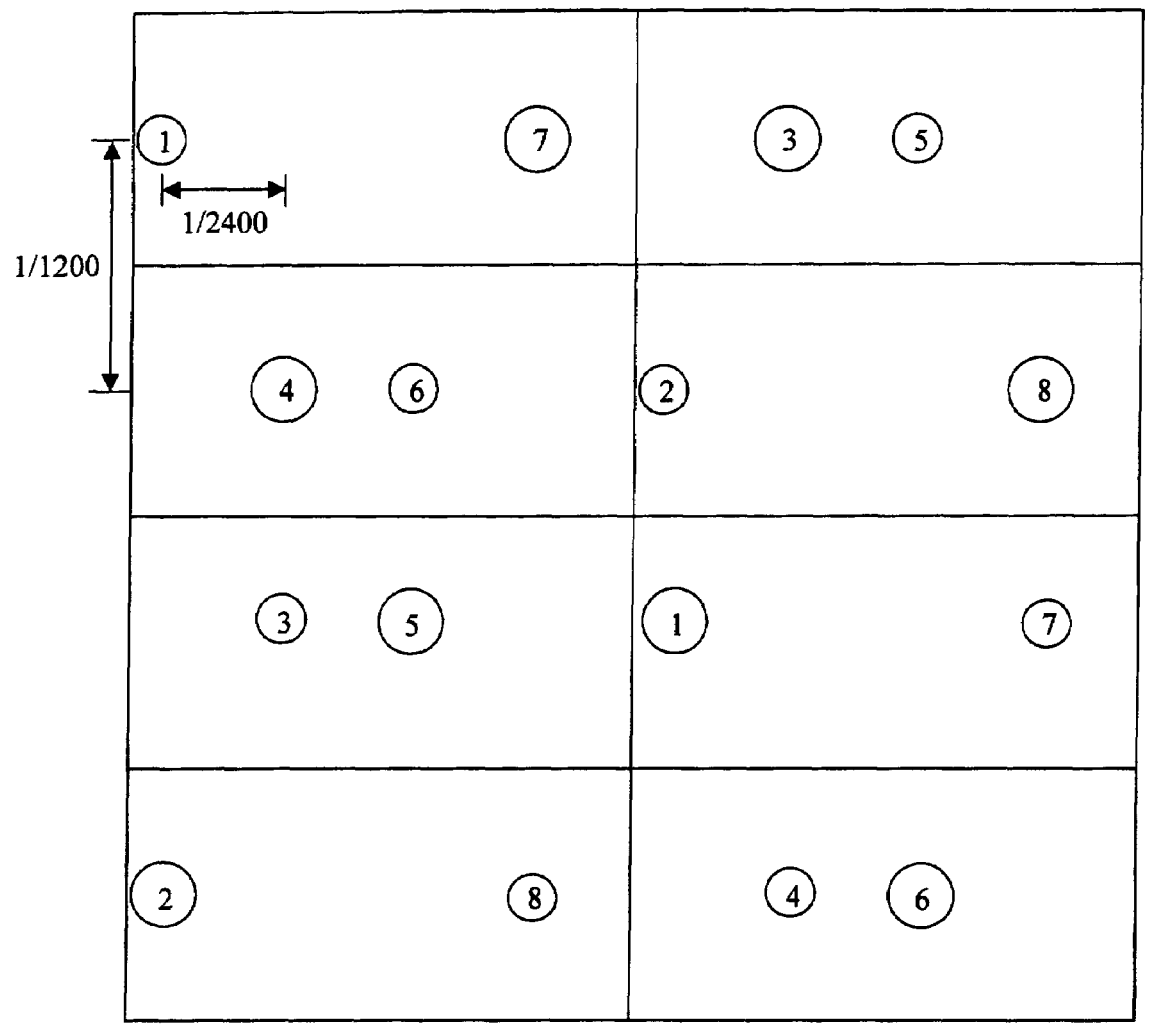
FIG. 13 shows a pictorial example of a portion of a matrix identifying primary locations for yellow at an output resolution of interest, in this example, at 2400 ×1200 dpi.

Based on an application of the rules set forth above, for example, for the 2400 ×1200 dpi output resolution of the locations shown in FIG. 6, FIG. 11 shows the primary locations for cyan, FIG. 12 shows the primary locations for magenta, and FIG. 13 shows the primary locations for yellow.

Figure 14:
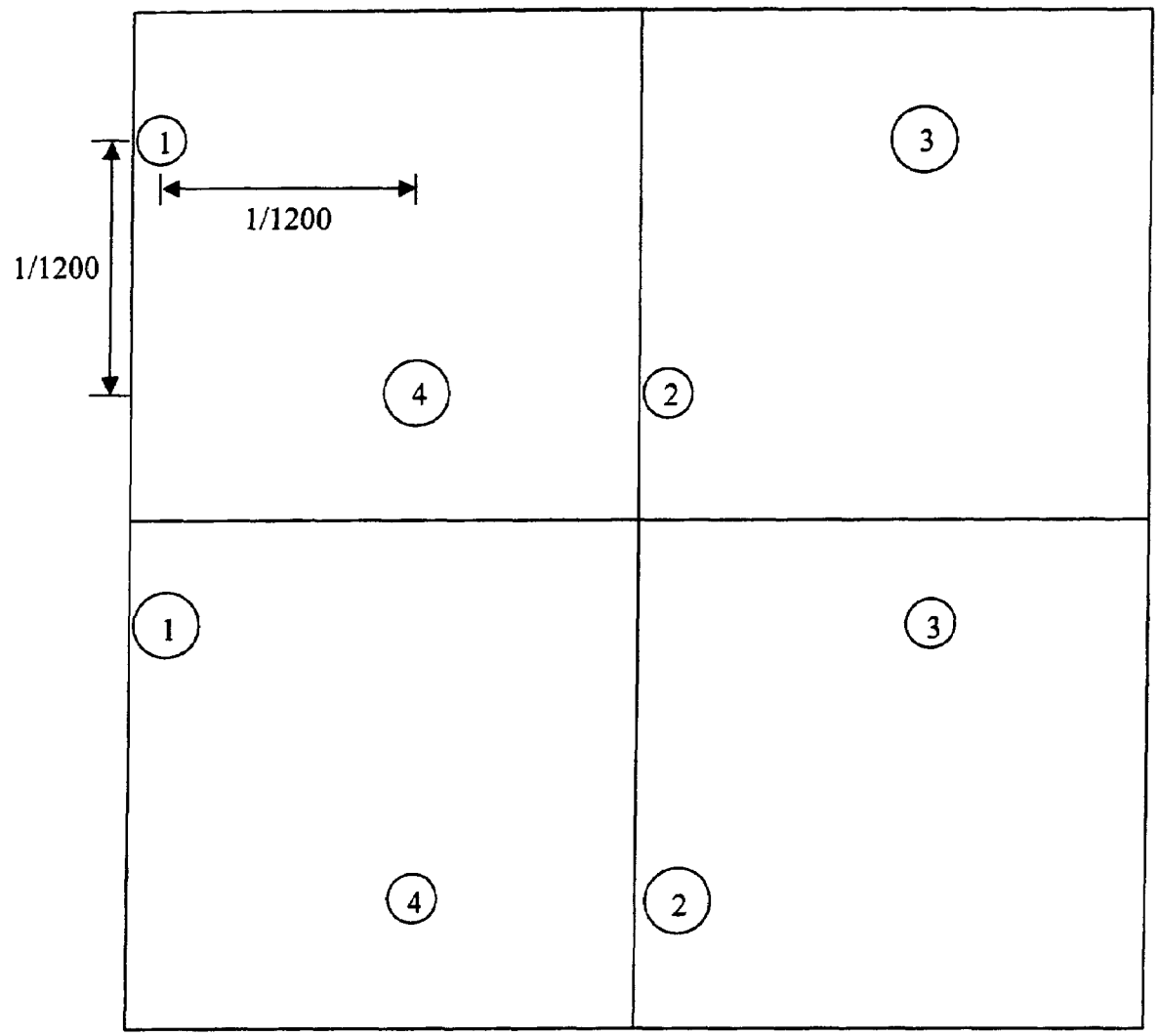
FIG. 14 shows a pictorial example of a portion of a matrix identifying primary locations for cyan at an output resolution of interest, in this example, at 1200 ×1200 dpi.
Figure 15:
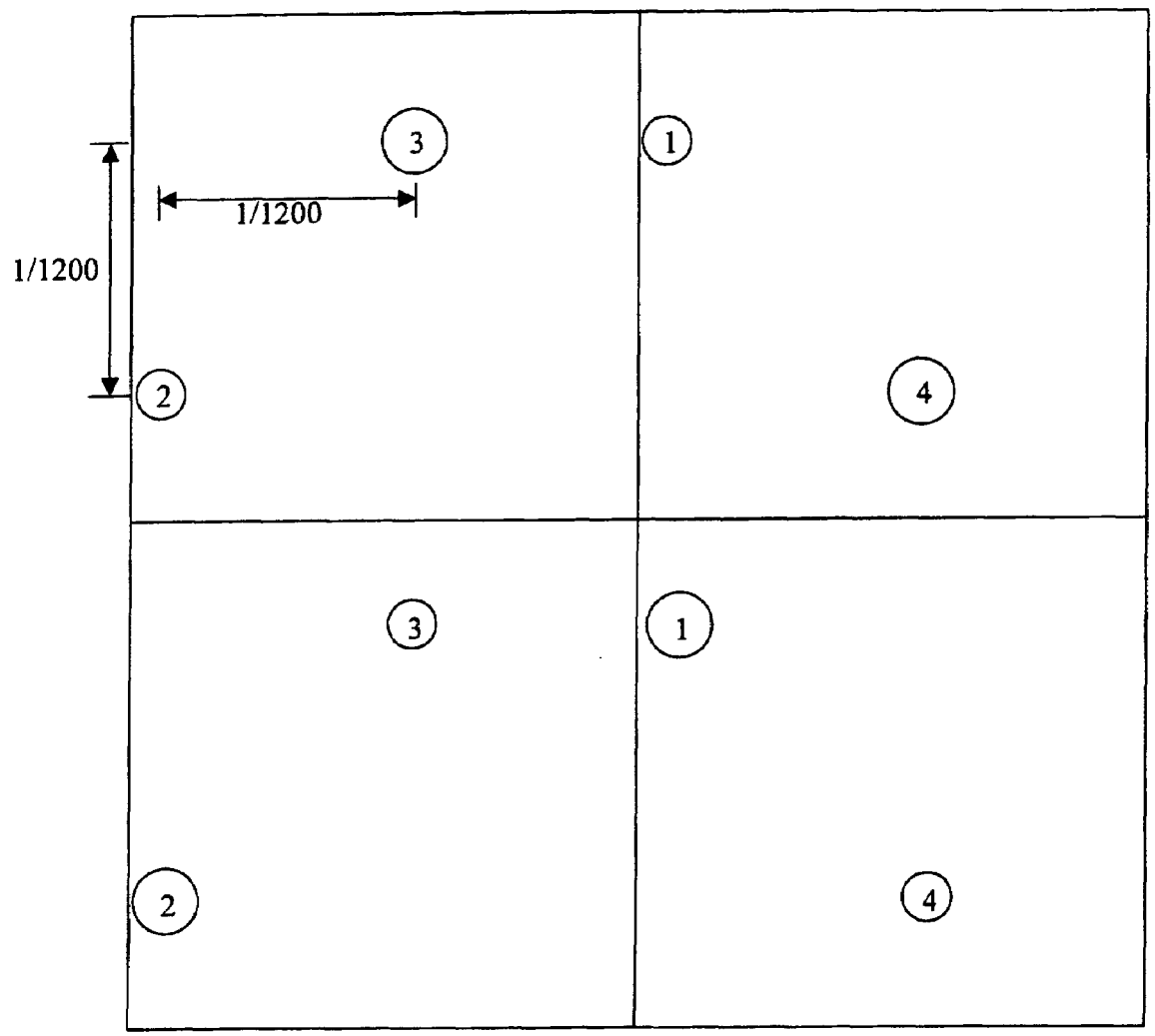
FIG. 15 shows a pictorial example of a portion of a matrix identifying primary locations for magenta at an output resolution of interest, in this example, at 1200 ×1200 dpi.
Figure 16:
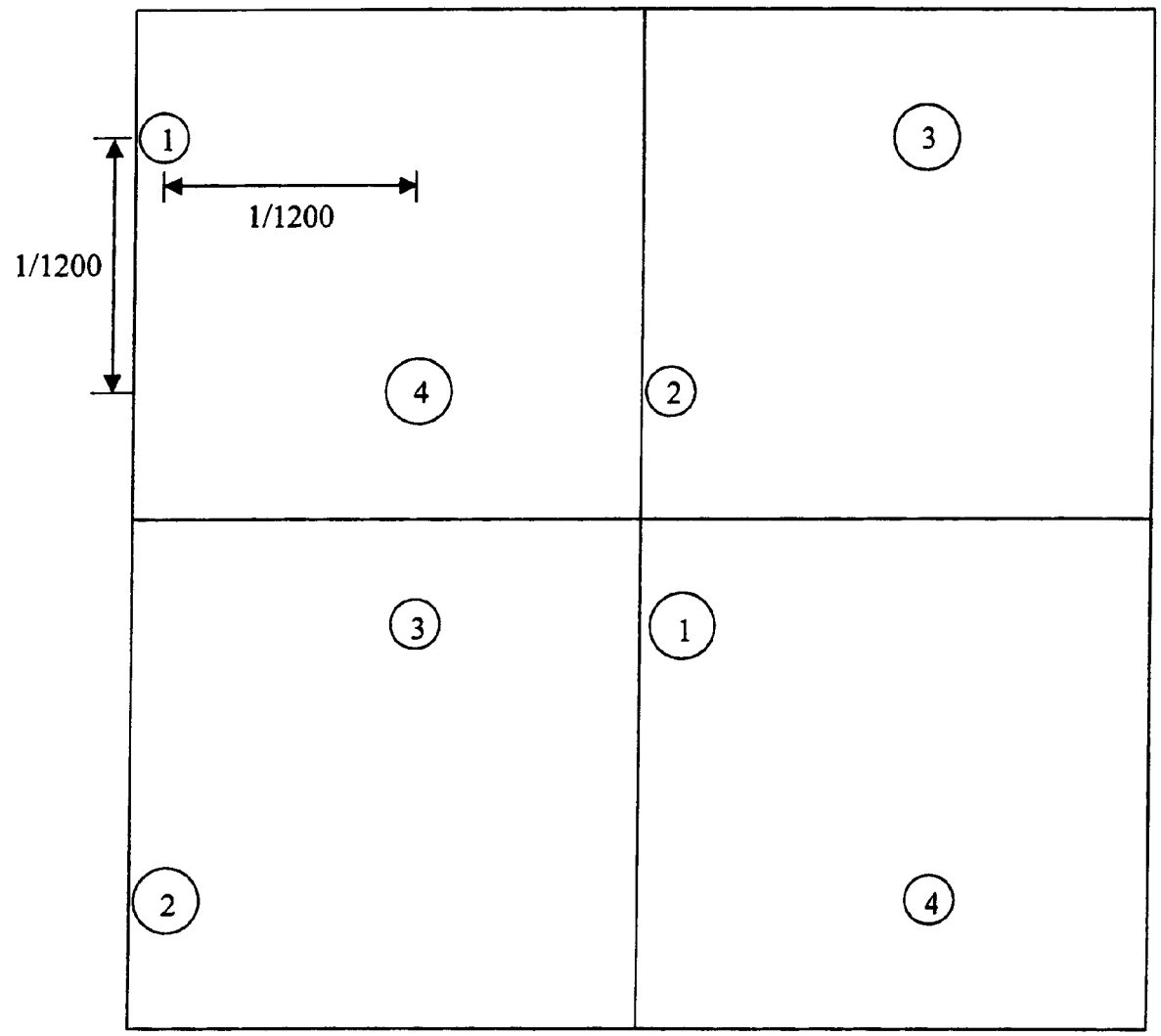
FIG. 16 shows a pictorial example of a portion of a matrix identifying primary locations for yellow at an output resolution of interest, in this example, at 1200 ×1200 dpi.

Based on an application of the rules set forth above, for example, for the 1200 ×1200 dpi output resolution of the locations shown in FIG. 7, FIG. 14 shows the primary locations for cyan, FIG. 15 shows the primary locations for magenta, and FIG. 16 shows the primary locations for yellow.

At step S104, secondary drop locations are defined in the matrix for each color of interest based, for example, on predefined criteria. In general, secondary drop locations are those locations which are not primary locations for the particular color of interest. Each of the secondary locations for a particular color is assigned a pass number of the plurality of pass numbers indicating a particular pass of a printhead in which a particular secondary location of said secondary locations can receive an ink drop of said particular color. The pass numbers for the secondary locations correspond to the pass numbers originally assigned for each of the drop locations for the entire matrix, discussed above in step S100.

At step S106, rules are established in order to assign the input data received from halftoning unit 50 to particular locations in the matrix. Exemplary rules are as follows:

Rule A1: No consecutive 600 dpi drops of the same color are permitted on the same pass, so as to limit the firing frequency per nozzle. Per raster, if drops are present on adjacent 600 dpi locations, those drops must go in their assigned primary locations.

Rule A2: For dense input data patterns, where choices are limited, preference is given to dominant colors for placement in primary locations (i.e., the non-dominant color will then be placed in secondary locations).

Rule A3: For sparse patterns, a toggle, e.g., a memory bit, is utilized to expand the distribution.

At step S108, image formatting unit 52 receives image data at an input resolution from halftoning unit 50, and applies the rules established in step S106 to the input data at the input resolution to map the input data to particular locations in the matrix to generate output data at the output resolution.

Each of steps S100, S102, S104 and S106 may be implemented, for example, in a look-up table accessible by image formatting unit 52, with step S108 being performed in real time by image formatting unit 52. Such a look-up table may be resident, for example, in image formatting unit 52, controller 18, imaging driver 32, or other locations in imaging apparatus 12 or host 14.

The following are three examples that apply the method of FIG. 4.

In Example 1 (see FIGS. 5, 8, 9 and 10), 1200 ×1200 dpi (dots, e.g., drops, per inch) resolution input data are converted into 4800 ×1200 dpi resolution output data using the method of FIG. 4. In Example 2 (see FIGS. 6, 11, 12 and 13), 600 ×1200 dpi resolution input data are converted into 2400 ×1200 dpi resolution output data using the method of FIG. 4. In Example 3 (see FIGS. 7, 14, 15 and 16), 600 ×600 dpi resolution input data are converted into 1200 ×1200 dpi resolution output data using the method of FIG. 4.

EXAMPLE 1

Example 1 applies the method of FIG. 4 to 1200 ×1200 dpi halftoned input data, including data for one large drop and one small drop, to generate 4800 ×1200 dpi output data. In general, all drops will stay in their specified 1200 ×1200 dpi location, and shifts will be performed horizontally to utilize 4800 dpi print locations.

At step S100, a matrix identifying all possible 4800 ×1200 dpi locations is established. As shown in FIG. 5, the 4800 ×1200 dpi locations are defined over a 4 ×4 block of 1200 ×1200 dpi locations, and repeated as necessary to fill the matrix. The drop size and pass number patterns are repeated as the partial matrix shown in FIG. 5 is expanded horizontally and vertically to complete the matrix.

At step S102, primary 4800 ×1200 dpi drop locations are defined in the matrix for each color of interest (e.g., C, c, M, m, Y, y; see FIGS. 8, 9 and 10). The map of primary 4800 dpi locations is designed to distribute the drops between the passes. This approach averages out and evenly distributes printhead and print mechanism inaccuracies. This effect is not only within a single color but also coordinates the differences in drop placement between the colors.

The primary locations are identified using the following rules:

Rule P1A: Primary locations are mapped based on raster and column. The map defining the primary 4800 dpi locations is defined over each 4 ×4 block of 1200 ×1200 dpi locations and repeated as necessary to complete the map.

Rule P2A: No consecutive horizontal 600 dpi drops of the same color are permitted on the same pass, so as to limit the firing frequency per nozzle. On a 1200 ×1200 basis, per raster, if drops are present on horizontally adjacent even 1200 dpi locations or horizontally adjacent odd 1200 dpi locations (i.e., adjacent 600 dpi locations), those drops must go in their assigned primary 4800 dpi locations. This forces adjacent drops to be printed on separate print passes. Also, this guarantees a maximum firing frequency, for example, of 9 kHz at a printhead carrier speed of 30 inches per second (ips).

Rule P3A: Dominant colors, e.g., cyan and magenta, are assigned different primary locations to mask print mechanism and printhead errors. A non-dominant color, e.g., yellow, will share primary locations with the dominant colors.

It is assumed that magenta and cyan are dominant colors, so the primary 4800 dpi locations are chosen to maximize separation of these two colors, as illustrated in FIGS. 8 and 9. Since there are a limited number of locations to choose from, yellow must then conflict with either cyan or magenta. FIG. 10 illustrates the primary locations for the yellow drops, chosen such that this conflict occurs evenly with respect to the other colors.

At step S104, secondary 4800 ×1200 dpi drop locations are defined in the matrix for each color of interest (e.g., C, c, M, m, Y, y), to further distribute the drops when possible. The secondary drop locations are those locations which are not primary locations for the particular color of interest.

At step S106, rules are established in order to assign the 1200 ×1200 dpi input data received from halftoning unit 50 to particular locations in the matrix. Exemplary rules are as follows:

Rule A1A: No consecutive 600 dpi drops of the same color are permitted on the same pass, so as to limit the firing frequency per nozzle. Per raster, if drops are present on adjacent 600 dpi locations, those drops must go in their assigned primary locations.

Rule A2A: For dense input data patterns, where choices are limited, preference is given to dominant colors for placement in primary locations (i.e., the non-dominant color will then be placed in secondary locations).

Rule A3A: For sparse patterns, a toggle, e.g., a memory bit, is utilized to expand the distribution.

Rule A4A: If a drop has no horizontally adjacent neighbors on a 600 dpi basis, then special rules are applied based on the number of drops per location. The following three cases are possible.

Case 1A: Three Drops Per Location

If the current location has three drops, i.e., one of each color, each of the drops is placed in its respective primary 4800 dpi location. These primary locations have already been assigned above to produce optimal print quality, therefore they should be utilized in this scenario, which pertains to dense patterns.

Case 2A: Two Drops Per Location

If the current location has two drops, and both drops have no horizontally adjacent 600 dpi neighbors, then the dominant color drop is placed in its primary 4800 dpi location. If the primary locations of both drops are in the same location, then the non-dominant color drop is placed in its secondary location. Since there are only two locations available, i.e., primary and secondary, the primary locations are set to spread out the visually dominant drops. In this case the two drops are spread to two different passes if possible, again further distributing the drops.

If the current location has two drops, and one drop has adjacent 600 dpi neighbors, the drop with the 600 dpi neighbor must go in its primary 4800 dpi location. Therefore, the drop with no 600 dpi neighbor is placed in the secondary location of the drop that has an adjacent 600 dpi neighbor.

Case 3A: One Drop Per Location

If the current location has one drop (of any color), the drop is placed in its primary 4800 dpi location, unless it is the only small, or only a large, drop in this location and none of the three colors have any 600 dpi neighbors, and a predefined memory bit is set. If all these conditions are set the drop is put in the secondary location and the memory bit is cleared. If the memory bit is cleared and all other conditions are met, the drop is put in the primary location and the memory bit is set.

There is a separate predefined memory bit for the odd and even 1200ths and the large drops and small drops. This allows sparsely spaced drops to be moved to different swaths to reduce their print frequency. In addition this will reduce the print defect due to missing or weak nozzles.

At step S108, image formatting unit 52 receives the input (image) data at an input resolution (e.g., 1200 ×1200 dpi) from halftoning unit 50, and applies the rules established in step S106 to the input data to map the input data to particular locations in the matrix to generate output data at the output resolution (e.g., 4800 ×1200 dpi).

EXAMPLE 2

Example 2 applies the method of FIG. 4 to 600 ×1200 dpi halftoned input data, including data for one large drop and one small drop, to generate 2400 ×1200 dpi resolution output data (see FIG. 6). In general, all drops will stay in their specified 600 ×1200 dpi location, and shifts will be performed horizontally to utilize 2400 dpi print locations.

At step S100, a matrix identifying all possible 2400 ×1200 dpi locations is established. As shown in FIG. 6, the 2400 ×1200 dpi locations are defined over a 4 ×4 block of 600 ×1200 dpi locations, and repeated as necessary to fill the matrix. The drop size and pass number patterns are repeated as the partial matrix shown in FIG. 6 is expanded horizontally and vertically to complete the matrix.

At step S102, primary 2400 ×1200 dpi locations are defined in the matrix for each color of interest (e.g., C, c, M, m, Y, y; see FIGS. 11, 12 and 13). The map of primary 2400 dpi locations is designed to distribute the drops between the passes. This approach averages out and evenly distributes printhead and print mechanism inaccuracies. This effect is not only within a single color but also coordinates the differences in drop placement between the colors.

The primary locations are identified using the following rules:

Rule P1B: Primary locations are mapped based on raster and column. The map defining the primary 2400 dpi locations is defined over each 4 ×4 block of 600 ×1200 dpi locations and repeated as necessary to complete the map.

Rule P2B: No consecutive horizontal 600 dpi drops of the same color are permitted in the same pass, so as to limit the firing frequency per nozzle. On a 600 ×1200 basis, per raster, if drops are present on horizontally adjacent even 600 dpi locations or horizontally adjacent odd 600 dpi locations, those drops must go in their assigned primary 2400 dpi locations. This forces adjacent drops to be printed on separate print passes, and forces the drops to be spread among swaths.

Rule P3B: Dominant colors, e.g., cyan and magenta, are assigned different primary locations to mask print mechanism and printhead errors. A non-dominant color, e.g., yellow, will share primary locations with the dominant colors.

At step S104, secondary 2400 ×1200 dpi locations are defined in the matrix for each color of interest (e.g., C, c, M, m, Y, y) to further distribute the drops when possible, so as to avoid horizontal neighbors. The secondary drop locations are those locations which are not primary locations for the particular color of interest.

At step S106, rules are established in order to assign the 600 ×1200 dpi input data received from halftoning unit 50 to particular locations in the matrix. Exemplary rules are as follows:

Rule A1B: No consecutive 600 dpi drops of the same color are permitted on the same pass, so as to limit the firing frequency per nozzle. Per raster, if drops are present on adjacent 600 dpi locations, those drops must go in their assigned primary locations.

Rule A2B: For dense input data patterns, where choices are limited, preference is given to dominant colors for placement in primary locations (i.e., the non-dominant color will then be placed in secondary locations).

Rule A3B: For sparse patterns, a toggle, e.g., a memory bit, is utilized to expand the distribution.

Rule A4B: If a drop has no horizontally adjacent neighbors on a 600 dpi basis, then special rules are applied based on the number of drops per location. The following three cases are possible.

Case 1B: Three Drops Per Location

If the current location has three drops, i.e., one of each color, each of the drops is placed in its respective primary 2400 dpi location. These primary locations have already been assigned above to produce optimal print quality, therefore they should be utilized in this scenario, which pertains to dense patterns.

Case 2B: Two Drops Per Location

If the current location has two drops, and both drops have no horizontally adjacent 600 dpi neighbors, then the dominant color drop is placed in its primary 2400 dpi location. If the primary locations of both drops are in the same location, then the non-dominant color drop is placed in its secondary location. Since there are only two locations available, i.e., primary and secondary, the primary locations are set to spread out the visually dominant drops. In this case the two drops are spread to two different passes if possible, again further distributing the drops.)

If the current location has two drops, and one drop has adjacent 600 dpi neighbors, the drop with the 600 dpi neighbor must go in its primary 2400 dpi location. Therefore, the drop with no 600 dpi neighbor is placed in the secondary location of the drop that has an adjacent 600 dpi neighbor.

Case 3B: One Drop Per Location

If the current location has one drop (of any color), the predefined memory bit is used. If the memory bit is set the drop is put in the secondary location and the memory bit is cleared. If the memory bit is cleared, the drop is put in the primary location and the memory bit is set.

There is a separate predefined memory bit for the large drops and small drops. This allows sparsely spaced drops to be moved to different swaths to reduce their print frequency. In addition this will reduce the print defect due to missing or weak nozzles.

At step S108, image formatting unit 52 receives the input (image) data at an input resolution (e.g., 600 ×1200 dpi) from halftoning unit 50, and applies the rules established in step S106 to the input data to map the input data to particular locations in the matrix to generate output data at the output resolution (e.g., 2400 ×1200 dpi).

EXAMPLE 3

Example 3 applies the method of FIG. 4 to 600 ×600 dpi halftoned input data, including data for one large drop and one small drop, to generate 1200 ×1200 dpi resolution output data (see FIG. 7). In general, all drops will stay in their specified 600 ×600 dpi locations, and shifts will be performed horizontally and vertically to utilize 1200 ×1200 dpi print locations.

At step S100, a matrix identifying all possible 1200 ×1200 dpi locations is established. As shown in FIG. 7, the 1200 ×1200 dpi locations are defined over a 4 ×4 block of 600 ×600 dpi locations, and repeated as necessary to fill the matrix. The drop size and pass number patterns are repeated as the partial matrix shown in FIG. 7 is expanded horizontally and vertically to complete the matrix.

At step S102, primary 1200 ×1200 dpi locations are defined in the matrix for each color of interest (e.g., C, c, M, m, Y, y; see FIGS. 14, 15 and 16). The map of primary 1200 ×1200 dpi locations is designed to distribute the drops between the passes. This approach averages out and evenly distributes printhead and print mechanism inaccuracies. This effect is not only within a single color but also coordinates the differences in drop placement between the colors.

The primary locations are identified using the following rules:

Rule P1C: Primary locations are mapped based on raster and column. The map defining the primary 1200 dpi locations is defined over each 4 ×4 block of 600 ×600 dpi locations and repeated as necessary to complete the map.

Rule P2C: No consecutive horizontal 600 dpi drops of the same color are permitted in the same pass, so as to limit the firing frequency per nozzle. The only exception is when two small drops, or two large drops, are desired in a 600 ×600 block, wherein one drop is placed in each of two passes per 600 ×600 dpi location (large or small). However, in all other cases, on a 600 ×600 basis, per raster, if drops are present on horizontally adjacent even 600 dpi locations or horizontally adjacent odd 600 dpi locations, those drops must go in their assigned primary 1200 dpi locations. This forces adjacent single drops to be printed on separate print passes, and forces the drops to be spread among swaths.

Rule P3C: Different colors are assigned different primary locations to mask print mechanism and printhead errors.

At step S104, secondary 1200 ×1200 dpi drop locations are defined in the matrix for each color of interest (e.g., C, c, M, m, Y, y), to further distribute the drops when possible. The secondary drop locations are those locations which are not primary locations for the particular color of interest.

At step S106, rules are established in order to assign the 1200 ×1200 dpi input data received from halftoning unit 50 to particular locations in the matrix. Exemplary rules are as follows:

Rule A1C: No consecutive 600 dpi drops of the same color are permitted on the same pass, so as to limit the firing frequency per nozzle. Per raster, if drops are present on adjacent 600 dpi locations, those drops must go in their assigned primary locations.

Rule A2C: For dense input data patterns, where choices are limited, preference is given to dominant colors for placement in primary locations (i.e., the non-dominant color will then be placed in secondary locations).

Rule A3C: For sparse patterns, a toggle, e.g., a memory bit, is utilized to expand the distribution.

Rule A4C: If a drop has no horizontally adjacent neighbors on a 600 dpi basis, then special rules are applied based on the number of drops per location. The following three cases are possible.

Case 1C: Three Drops Per Location

If the current location has three drops, i.e., one of each color, each of the drops is placed in its respective primary 1200 dpi location. These primary locations have already been assigned above to produce optimal print quality, therefore they should be utilized in this scenario, which pertains to dense patterns.

Case 2C: Two Drops Per Location

If the current location has two drops, and both drops have no horizontally adjacent 600 dpi neighbors, then the dominant color drop is placed in its primary 1200 dpi location. If the primary locations of both drops are in the same location, then the non-dominant color drop is placed in its secondary location. Since there are only two locations available, i.e., primary and secondary, the primary locations are set to spread out the visually dominant drops. In this case the two drops are spread to two different passes if possible, again further distributing the drops.

If the current location has two drops, and one drop has adjacent 600 dpi neighbors, the drop with the 600 dpi neighbor must go in its primary 1200 dpi location. Therefore, the drop with no 600 dpi neighbor is placed in the secondary location of the drop that has an adjacent 600 dpi neighbor.

Case 3C: One Drop Per Location

If the current location has one drop (of any color), the predefined memory bit is read. If the memory bit is set the drop is put in the secondary location and the memory bit is cleared. If the memory bit is cleared, the drop is put in the primary location and the memory bit is set.

There is a separate predefined memory bit for the large drops and small drops. This allows sparsely spaced drops to be moved to different swaths to reduce their print frequency. In addition this will reduce the print defect due to missing or weak nozzles.

At step S108, image formatting unit 52 receives the input (image) data at an input resolution (e.g., 600 ×600 dpi) from halftoning unit 50, and applies the rules established in step S106 to the input data to map the input data to particular locations in the matrix to generate output data at the output resolution (e.g., 1200 ×1200 dpi).

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method for performing drop placement by an imaging apparatus, comprising the steps of: defining a matrix that identifies all possible drop locations at an output resolution; defining primary drop locations in said matrix for each color of interest based on predefined criteria; defining secondary drop locations in said matrix for said each color of interest; and establishing rules to assign input data received at an input resolution to particular locations of said primary drop locations and said secondary drop locations in said matrix based on an assessment of said input data with respect to drop placement at adjacent drop locations at a predefined resolution.

2. The method of claim 1, further comprising the steps of:
receiving said input data at said input resolution; and
applying said rules to map said input data to said particular locations in said matrix to generate output data at said output resolution.

3. The method of claim 1, wherein each of said primary drop locations for a particular color is assigned a pass number of a plurality of pass numbers indicating a particular pass of a printhead in which a particular primary location of said primary drop locations can receive an ink drop of said particular color.

4. The method of claim 1, wherein each of said secondary drop locations for a particular color is assigned a pass number of a plurality of pass numbers indicating a particular pass of a printhead in which a particular secondary location of said secondary drop locations can receive an ink drop of said particular color.

5. The method of claim 1, wherein said each color of interest includes a plurality of colors, said rules including a rule that no consecutive drops at said predefined resolution of a same color are permitted on a particular pass of a printhead.

6. The method of claim 5, wherein if input data received for application to said matrix defines drops at adjacent locations at a predefined resolution, said drops are assigned to respective primary drop locations.

7. The method of claim 1, wherein said method is implemented by at least one of said imaging apparatus and a host computer.

8. A method for performing drop placement by an imaging apparatus, comprising the steps of: defining a matrix that identifies all possible drop locations at an output resolution; defining primary drop locations in said matrix for each color of interest based on predefined criteria; defining secondary drop locations in said matrix for said each color of interest; and establishing rules to assign input data received at an input resolution to particular locations of said primary drop locations and said secondary drop locations in said matrix, said rules including a rule that for dense input data patterns, preference is given to a dominant color for placement in said primary drop locations, and a non-dominant color will be placed in said secondary drop locations.

9. The method of claim 8, wherein said dominant color is one of cyan and magenta, and said non-dominant color is yellow.

10. A method for performing drop placement by an imaging apparatus, comprising the steps of: defining a matrix that identifies all possible drop locations at an output resolution; defining primary drop locations in said matrix for each color of interest based on predefined criteria; defining secondary drop locations in said matrix for said each color of interest; and establishing rules to assign input data received at an input resolution to particular locations of said primary drop locations and said secondary drop locations in said matrix, said rules including a rule that if input data received for application to said matrix define no horizontally adjacent neighbors at a predefined resolution, then performing the further step of selecting an additional rule based on a number of drops per location.

11. A method of drop placement in forming an image, comprising the steps of:
defining an input resolution for a plurality of colors;
defining an output resolution in a first direction, said output resolution in said first direction being greater than said input resolution in said first direction;
defining a matrix of drop locations at said output resolution;
subdividing said matrix of drop locations into subdivisions at said input resolution, wherein a number of said drop locations in each subdivision in said first direction is equal to said output resolution in said first direction divided by said input resolution in said first direction;
defining, for said each subdivision, a first primary drop location and a first secondary drop location for a first color of said plurality of colors;
defining, for said each subdivision, a second primary drop location and a second secondary drop location for a second color of said plurality of colors;
determining for said each subdivision whether ink of said first color will be deposited at one of said first primary location and said first secondary location;
determining for said each subdivision whether ink of said second color will be deposited at one of said second primary location and said second secondary location;
depositing an ink drop of said first color, if any, at only one of said first primary location and said first secondary location within one subdivision of said subdivisions; and
depositing an ink drop of said second color, if any, at only one of said second primary location and said second secondary location within one subdivision of said subdivisions.

12. The method of claim 11, wherein said first primary location for said first color is a different location from that of said second primary location for said second color.

13. The method of claim 12, wherein said first color is a dominant color and said second color is a dominant color.

14. The method of claim 11, wherein said first primary location for said first color corresponds to said second primary location for said second color.

15. The method of claim 14, wherein said first color is a dominant color and said second color is a non-dominant color.

16. A method for performing drop placement by an imaging apparatus, comprising the steps of:
establishing a matrix at an output resolution that defines a plurality of primary drop locations for each color of a plurality of colors; and
establishing rules to assign input data received at an input resolution to particular primary drop locations of said plurality of primary drop locations such that no dominant color shares a primary drop location with another dominant color.

17. The method of claim 16, further comprising the steps of:
receiving said input data at said input resolution; and applying said rules to map said input data to said particular primary drop locations in said matrix to generate output data at said output resolution.

18. The method of claim 16, wherein each primary drop location for a particular color is assigned a pass number of a plurality of pass numbers indicating a particular pass of a printhead in which a particular primary location of said primary drop locations for said particular color can receive an ink drop of said particular color.

19. The method of claim 16, said rules including a rule that no consecutive drops at a predefined resolution of a same color are permitted on a particular pass of a printhead.

20. The method of claim 16, wherein said dominant color is one of cyan and magenta, and a non-dominant color is yellow.

* * * * *